US012703030B2

(12) United States Patent
Ukei et al.

(10) Patent No.: US 12,703,030 B2
(45) Date of Patent: Aug. 11, 2026

(54) END MILL

(71) Applicant: OSG CORPORATION, Toyokawa (JP)

(72) Inventors: Shigetoshi Ukei, Toyokawa (JP); Masataka Isobe, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 613 days.

(21) Appl. No.: 18/254,767

(22) PCT Filed: Nov. 30, 2020

(86) PCT No.: PCT/JP2020/044551
§ 371 (c)(1),
(2) Date: May 26, 2023

(87) PCT Pub. No.: WO2022/113358
PCT Pub. Date: Jun. 2, 2022

(65) Prior Publication Data

US 2023/0415248 A1 Dec. 28, 2023

(51) Int. Cl.
*B23C 5/10* (2006.01)

(52) U.S. Cl.
CPC ........ *B23C 5/10* (2013.01); *B23C 2210/0485* (2013.01); *B23C 2210/086* (2013.01); *B23C 2210/325* (2013.01)

(58) Field of Classification Search
CPC ...... B23C 2210/0485; B23C 2210/325; B23C 2210/54; B23C 2210/08; B23C 2210/086;
(Continued)

(56) References Cited

U.S. PATENT DOCUMENTS 4,285,618 A 8/1981 Shanley, Jr.
4,963,059 A 10/1990 Hiyama
(Continued)

FOREIGN PATENT DOCUMENTS

CN 201095010 Y 8/2008
CN 105228780 A 1/2016
(Continued)

OTHER PUBLICATIONS

Jul. 30, 2024 extended Search Report issued in European Patent Application No. 20963621.6.
(Continued)

*Primary Examiner* — Nicole N Ramos
(74) *Attorney, Agent, or Firm* — Oliff PLC

(57) ABSTRACT

An end mill includes a plurality of peripheral cutting edges have respective helix angles which are equal to each other and which range from 0° to 5°. Each of the plurality of peripheral cutting edges is defined by one of four types of teeth A-D consisting of (a) teeth A-C each defining a partially-uneven cutting edge that includes an uneven edge portion consisting of a nicked portion or a roughing portion and (b) a tooth D that does not define the uneven edge portion. The peripheral cutting edges are defined by at least two of the four types of teeth A-D, such that each adjacent pair of the peripheral cutting edges adjacent to each other are defined by the teeth that are different in type from each other.

11 Claims, 16 Drawing Sheets

(58) Field of Classification Search

CPC ........ B23C 2210/088; B23C 2210/084; B23C 2210/32; B23C 2210/326; B23C 2228/10; B23C 2250/16; B23C 5/10; B23C 5/1009; B23C 5/165

See application file for complete search history.

(56) References Cited

U.S. PATENT DOCUMENTS

| | | | | |
|---|---|---|---|---|
| 6,164,876 | A * | 12/2000 | Cordovano | B23C 5/10 407/59 |
| 7,399,147 | B1 | 7/2008 | VanDyke, Jr. | |
| 7,544,021 | B2 * | 6/2009 | Flynn | B23C 5/003 407/54 |
| 9,327,353 | B2 * | 5/2016 | Shpigelman | B23C 5/10 |
| 10,118,236 | B2 | 11/2018 | Archambault | |
| 2007/0098506 | A1 | 5/2007 | Flynn | |
| 2014/0356083 | A1 | 12/2014 | Budda | |
| 2016/0089728 | A1 | 3/2016 | Archambault | |
| 2017/0106606 | A1 * | 4/2017 | Toyozumi | C08J 5/04 |
| 2018/0036810 | A1 * | 2/2018 | Stojanovski | B23C 5/1009 |
| 2019/0168317 | A1 * | 6/2019 | Kanno | C03C 19/00 |
| 2019/0291189 | A1 | 9/2019 | Onchi | |

FOREIGN PATENT DOCUMENTS

| | | | | |
|---|---|---|---|---|
| CN | 109551029 | A * | 4/2019 | B23C 5/10 |
| CN | 211360799 | U | 8/2020 | |
| EP | 0352224 | A1 * | 1/1990 | G05B 19/40937 |
| JP | S63-089212 | A | 4/1988 | |
| JP | H01-127214 | A | 5/1989 | |
| JP | H01-143311 | U | 10/1989 | |
| JP | H07-060527 | A | 3/1995 | |
| JP | 3145277 | U | 10/2008 | |
| JP | 2011-020248 | A | 2/2011 | |
| JP | 2011-110661 | A | 6/2011 | |
| JP | 2012-086279 | A | 5/2012 | |
| KR | 20120023466 | A * | 3/2012 | B23C 5/10 |
| WO | 2008/052503 | A1 | 5/2008 | |
| WO | 2018/079489 | A1 | 5/2018 | |

OTHER PUBLICATIONS

Mar. 13, 2025 Office Action issued in Chinese Patent Application No. 202080107520.6.

Jan. 19, 2021 International Search Report issued in International Patent Application No. PCT/JP2020/044551.

Jan. 19, 2021 Written Opinion of the International Searching Authority issued in International Patent Application No. PCT/JP2020/044551.

May 25, 2021 Written Opinion of the International Preliminary Examining Authority issued in International Patent Application No. PCT/JP2020/044551.

* cited by examiner

| TOOTH A | TOOTH B |
|---|---|
| 0.7L<br>0.05L ~0.65L<br>L<br>Er | Er<br>L<br>0.7L<br>0.05L ~0.65L |
| **TOOTH C** | **TOOTH D** |
| 0.35L<br>0.05L ~0.65L<br>L<br>0.35L<br>Er | L |

FIG.3

| NORMAL TOOTH | NICKED TOOTH | ROUGHING TOOTH |
|---|---|---|
| NORMAL TOOTH | NICKED TOOTH | ROUGHING TOOTH |

FIG.4

| | IMAGE | TOOTH 1 | TOOTH 2 | TOOTH 3 |
|---|---|---|---|---|
| EXAMPLE 1 NICKED TOOTH | | A | B | C |
| EXAMPLE 2 NICKED TOOTH | | B | A | C |
| EXAMPLE 3 NICKED TOOTH | | A | B | D |
| EXAMPLE 4 NICKED TOOTH | | B | A | D |
| EXAMPLE 5 ROUGHING TOOTH | | A | B | C |
| EXAMPLE 6 ROUGHING TOOTH | | B | A | C |
| EXAMPLE 7 ROUGHING TOOTH | | A | B | D |
| EXAMPLE 8 ROUGHING TOOTH | | B | A | D |

FIG.5

《THREE TEETH》

| TOOTH 1 | TOOTH 2 | TOOTH 3 |
|---|---|---|
| A | B | C |
| A | B | D |
| A | C | B |
| A | C | D |
| A | D | B |
| A | D | C |
| B | C | D |
| B | D | C |

《FOUR TEETH》

| TOOTH 1 | TOOTH 2 | TOOTH 3 | TOOTH 4 |
|---|---|---|---|
| A | B | A | B |
| A | B | A | C |
| A | B | A | D |
| A | B | C | B |
| A | B | C | D |
| A | B | D | B |
| A | B | D | C |
| A | C | A | C |
| A | C | A | D |
| A | C | B | C |
| A | C | B | D |
| A | C | D | B |
| A | C | D | C |
| A | D | A | D |
| A | D | B | C |
| A | D | B | D |
| A | D | C | B |
| A | D | C | D |
| B | C | B | C |
| B | C | B | D |
| B | C | D | C |
| B | D | B | D |
| B | D | C | D |
| C | D | C | D |

《FIVE TEETH》

| TOOTH 1 | TOOTH 2 | TOOTH 3 | TOOTH 4 | TOOTH 5 |
|---|---|---|---|---|
| A | B | A | B | C |
| A | B | A | B | D |
| A | B | A | C | B |
| A | B | A | C | D |
| A | B | A | D | B |
| A | B | A | D | C |
| A | B | C | A | C |
| A | B | C | A | D |
| A | B | C | B | C |
| A | B | C | B | D |
| A | B | C | D | B |
| A | B | C | D | C |
| A | B | D | A | C |
| A | B | D | A | D |
| A | B | D | B | C |
| A | B | D | B | D |
| A | B | D | C | B |
| A | B | D | C | D |
| A | C | D | A | C |
| A | C | D | A | D |
| A | C | D | B | C |
| A | C | D | B | D |
| A | C | D | C | B |
| A | C | D | C | D |
| A | D | A | D | B |
| A | D | A | D | C |
| A | D | B | D | B |
| A | D | B | D | C |
| A | D | C | D | B |
| A | D | C | D | C |

FIG.10
| No | TOOTH 1 | TOOTH 2 | TOOTH 3 | HELIX ANGLE |
|---|---|---|---|---|
| 1 | TOOTH D (0%) | TOOTH D (0%) | TOOTH D (0%) | 5° |
| 2 | TOOTH A (60%) | TOOTH B (60%) | TOOTH D (0%) | 5° |
| 3 | TOOTH A (60%) | TOOTH B (60%) | TOOTH C (60%) | 5° |
FIG.11
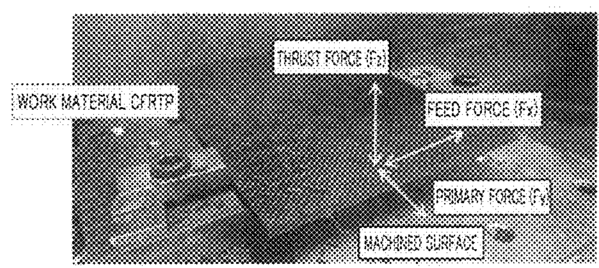
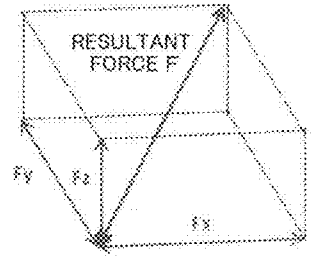
FIG.12
T
TOOL
Wf
W
WORKPIECE (CFRTP)
2mm
TABLE
30mm
FIG.13
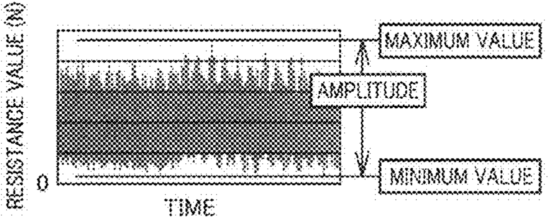

FIG.14

| ITEM | CONDITION 1 | CONDITION 2 |
|---|---|---|
| WORK MATERIAL | CFRTP | CFRTP |
| TOOL SIZE | Φ6 | Φ6 |
| CUTTING VELOCITY | 200m/min | 400m/min |
| NUMBER OF REVOLUTIONS | 10,610min$^{-1}$ | 21,221min$^{-1}$ |
| FEED RATE | 2,546mm/min | 3,183mm/min |
| FEED RATE PER TOOTH | 0.08mm/t | 0.05mm/t |
| CUTTING METHOD | TRIMMING | TRIMMING |
| WORK THICKNESS | 5mm | 5mm |

FIG.15

| No. | CONDITION 1 | | CONDITION 2 | |
|---|---|---|---|---|
| | AMPLITUDE (N) | RATIO | AMPLITUDE (N) | RATIO |
| 1 | 264 | 100% | 1317 | 100% |
| 2 | 207 | 78% | 392 | 30% |
| 3 | 156 | 59% | 261 | 20% |

FIG.16
CONDITION 1
AMPLITUDE (N)
300
250
200
150
100
50
0
No.1 No.2 No.3
FIG.17
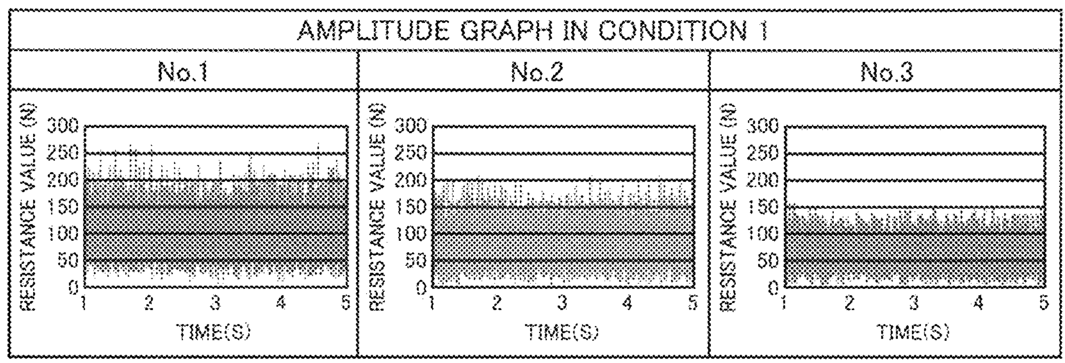
FIG.18
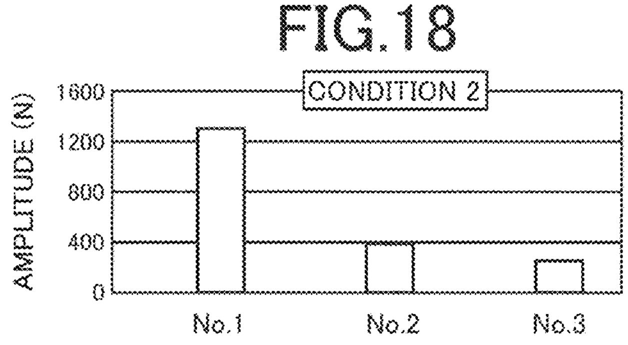
FIG.19
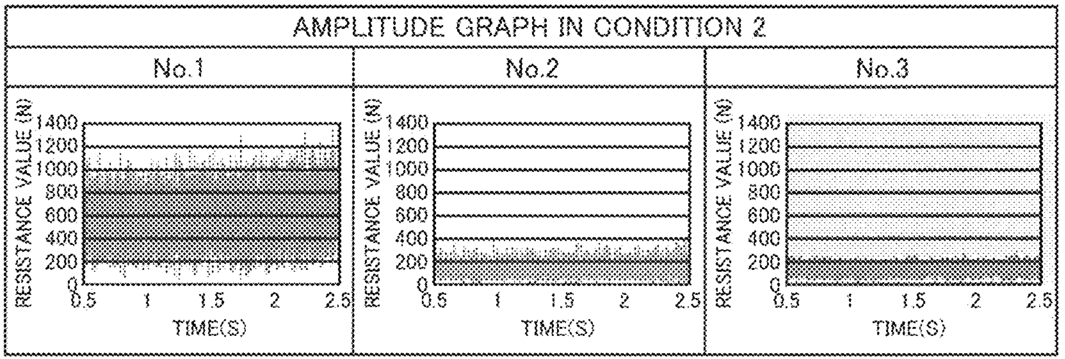

FIG.20
| WORK MATERIAL | S50C |
|---|---|
| TOOL SIZE | Φ6 |
| CUTTING VELOCITY | 70m/min |
| NUMBER OF REVOLUTIONS | 3,714min$^{-1}$ |
| FEED RATE | 557mm/min |
| FEED RATE PER TOOTH | 0.05mm/t |
| CUTTING AMOUNT ap | 6mm |
| CUTTING AMOUNT ae | 0.6mm |
FIG.21
| No. | AMPLITUDE (N) | RATIO |
|---|---|---|
| 1 | 210 | 100% |
| 2 | 184 | 88% |
| 3 | 169 | 81% |
FIG.22
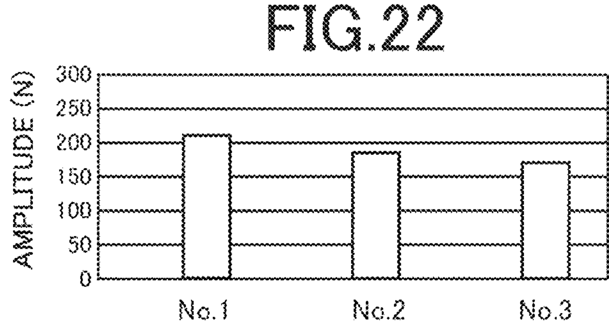
FIG.23
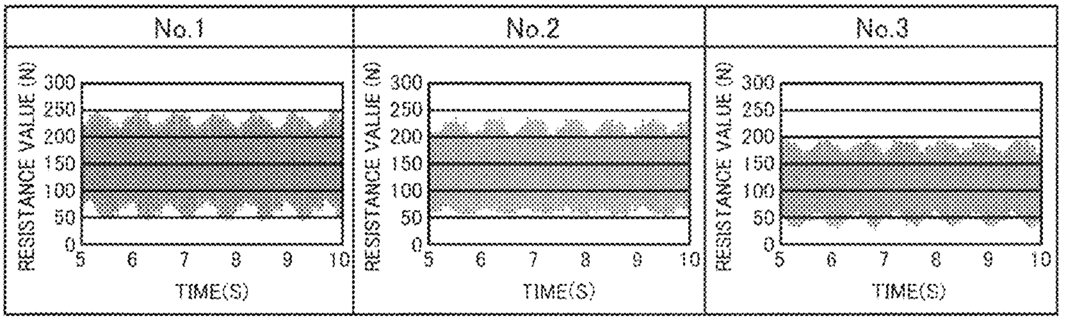

FIG.24

| No | RATIO OF ROUGHING TOOTH | TOOTH 1 | TOOTH 2 | TOOTH 3 | HELIX ANGLE |
|---|---|---|---|---|---|
| 1 | 0% | TOOTH D (0%) | TOOTH D (0%) | TOOTH D (0%) | 5° |
| 2 | 5% | TOOTH A (5%) | TOOTH B (5%) | TOOTH C (5%) | 5° |
| 3 | 25% | TOOTH A (25%) | TOOTH B (25%) | TOOTH C (25%) | 5° |
| 4 | 45% | TOOTH A (45%) | TOOTH B (45%) | TOOTH C (45%) | 5° |
| 5 | 65% | TOOTH A (65%) | TOOTH B (65%) | TOOTH C (65%) | 5° |
| 6 | 85% | TOOTH A (85%) | TOOTH B (85%) | TOOTH C (85%) | 5° |

FIG.25

| WORK MATERIAL | CFRTP |
|---|---|
| TOOL SIZE | Φ6 |
| CUTTING VELOCITY | 50~400m/min |
| FEED RATE PER TOOTH | 0.05mm/t |
| MACHINING METHOD | TRIMMING |

FIG.26

| No | RATIO OF ROUGHING TOOTH | CUTTING VELOCITY (m/min) | | | | | | | |
|---|---|---|---|---|---|---|---|---|---|
| | | 50 | 100 | 150 | 200 | 250 | 300 | 350 | 400 |
| 1 | 0% | ○ | ○ | × | × | × | × | × | × |
| 2 | 5% | ○ | ○ | ○ | ○ | ○ | ○ | ○ | ○ |
| 3 | 25% | ○ | ○ | ○ | ○ | ○ | ○ | ○ | ○ |
| 4 | 45% | ○ | ○ | ○ | ○ | ○ | ○ | ○ | ○ |
| 5 | 65% | ○ | ○ | ○ | ○ | ○ | ○ | ○ | ○ |
| 6 | 85% | ○ | ○ | ○ | ○ | × | × | × | × |

EVALUATION : ○STABLY MACHINED ×LARGE VIBRATION

| No | TOOTH 1 | TOOTH 2 | TOOTH 3 | HELIX ANGLE |
|---|---|---|---|---|
| 1 | TOOTH A (60%) | TOOTH B (60%) | TOOTH C (60%) | 5° |
| 2 | TOOTH A (60%) | TOOTH B (60%) | TOOTH B (60%) | 5° |
| 3 | TOOTH A (60%) | TOOTH C (60%) | TOOTH C (60%) | 5° |

| WORK MATERIAL | CFRTP |
|---|---|
| TOOL SIZE | Φ6 |
| CUTTING VELOCITY | 200m/min |
| NUMBER OF REVOLUTIONS | 10,610min$^{-1}$ |
| FEED RATE | 2,546mm/min |
| FEED RATE PER TOOTH | 0.08mm/t |
| MACHINING METHOD | TRIMMING |
| WORK THICKNESS | 5mm |

| | No.1 | No.2 | No.3 |
|---|---|---|---|
| AMPLITUDE GRAPH |  | | |
| AMPLITUDE (N) | 225 | 289 | 274 |
| RATIO | 100% | 128% | 122% |

| WORK MATERIAL | S50C |
|---|---|
| TOOL SIZE | Φ6 |
| CUTTING VELOCITY | 40m/min |
| NUMBER OF REVOLUTIONS | $2{,}122 min^{-1}$ |
| FEED RATE | 254mm/min |
| FEED RATE PER TOOTH | 0.04mm/t |
| CUTTING AMOUNT ap | 6mm |
| CUTTING AMOUNT ae | 0.15mm |

| | No.1 | No.2 | No.3 |
|---|---|---|---|
| AMPLITUDE GRAPH | | | |
| AMPLITUDE (N) | 63 | 70 | 72 |
| RATIO | 100% | 112% | 115% |

FIG.32

| No | HELIX ANGLE | ROUGHING TOOTH |
|---|---|---|
| 1 | 0° | NOT INCLUDED |
| 2 | 15° | NOT INCLUDED |
| 3 | 30° | NOT INCLUDED |
| 4 | 45° | NOT INCLUDED |
| 5 | 0° | INCLUDED |
| 6 | 15° | INCLUDED |
| 7 | 30° | INCLUDED |
| 8 | 45° | INCLUDED |

FIG.33

| No | HELIX ANGLE | TOOTH 1 | TOOTH 2 | TOOTH 3 |
|---|---|---|---|---|
| 5 | 0° | TOOTH A (60%) | TOOTH B (60%) | TOOTH C (60%) |
| 6 | 15° | TOOTH A (60%) | TOOTH B (60%) | TOOTH C (60%) |
| 7 | 30° | TOOTH A (60%) | TOOTH B (60%) | TOOTH C (60%) |
| 8 | 45° | TOOTH A (60%) | TOOTH B (60%) | TOOTH C (60%) |

FIG.34

| WORK MATERIAL | CFRTP |
|---|---|
| TOOL SIZE | Φ6 |
| CUTTING VELOCITY | 50~400m/min |
| FEED RATE PER TOOTH | 0.08mm/t |
| MACHINING METHOD | TRIMMING |

FIG.35

| No | HELIX ANGLE | CUTTING VELOCITY (m/min) | | | | | | | |
|---|---|---|---|---|---|---|---|---|---|
| | | 50 | 100 | 150 | 200 | 250 | 300 | 350 | 400 |
| 1 | 0° | ○ | ○ | × | × | × | × | × | × |
| 2 | 15° | ○ | ○ | ○ | ○ | ○ | △ | × | × |
| 3 | 30° | ○ | ○ | ○ | ○ | ○ | △ | △ | × |
| 4 | 45° | ○ | ○ | ○ | ○ | ○ | ○ | ○ | ○ |
| 5 | 0° | ○ | ○ | ○ | ○ | ○ | ○ | ○ | ○ |
| 6 | 15° | ○ | ○ | ○ | ○ | ○ | ○ | ○ | ○ |
| 7 | 30° | ○ | ○ | ○ | ○ | ○ | ○ | ○ | ○ |
| 8 | 45° | ○ | ○ | ○ | ○ | ○ | ※ | ※ | ※ |

EVALUATION : ○NO FUSION △A FEW FUSIONS ×LOTS OF FUSIONS ※TOOTH CHIPPING

FIG.36

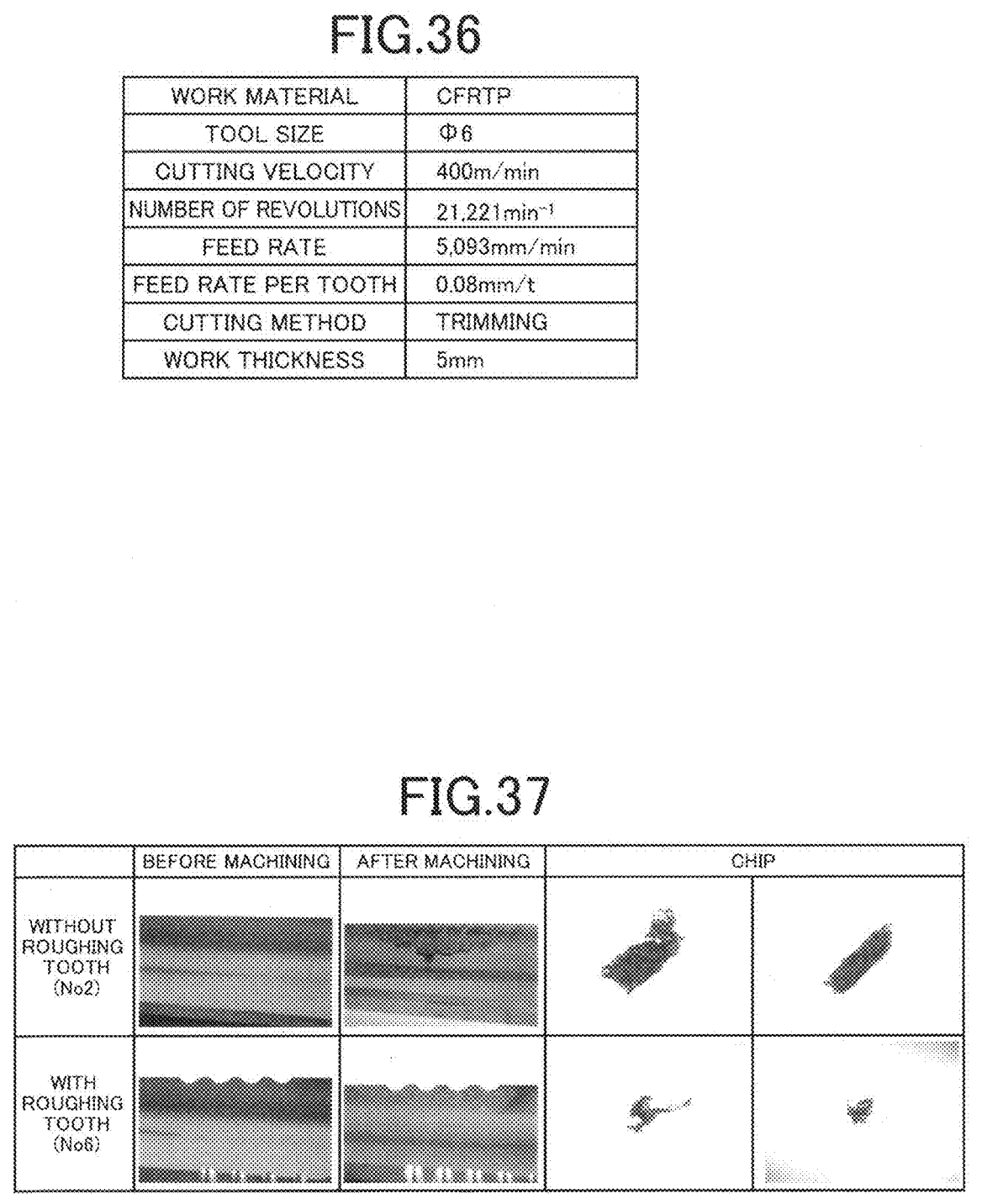

| WORK MATERIAL | CFRTP |
|---|---|
| TOOL SIZE | Φ6 |
| CUTTING VELOCITY | 400m/min |
| NUMBER OF REVOLUTIONS | 21,221min$^{-1}$ |
| FEED RATE | 5,093mm/min |
| FEED RATE PER TOOTH | 0.08mm/t |
| CUTTING METHOD | TRIMMING |
| WORK THICKNESS | 5mm |

FIG.37

| | BEFORE MACHINING | AFTER MACHINING | CHIP | |
|---|---|---|---|---|
| WITHOUT ROUGHING TOOTH (No2) | | | | |
| WITH ROUGHING TOOTH (No6) | | | | |

END MILL

TECHNICAL FIELD

The present invention relates to an end mill, and particularly, to new techniques effective to suppress chatter vibration.

BACKGROUND ART

When a machining operation is being performed by an end mill, if chatter vibration occurs, a cutting velocity should be limited or a surface smoothness of a machined surface is worsened. In order to suppress the chatter vibration, there is proposed a variable-lead end mill in which a plurality of peripheral cutting edges having respective helix angles that are different from each other. Patent Document 1 discloses an endmill as an example of such an end mill. In the disclosed end mill, owing to the difference of the helix angle, a direction and a magnitude of a cutting force (resistance) vary and an interval between the cutting edges is changed whereby resonance is suppressed, so that it is possible to suppress the chatter vibration that could be caused by the resonance.

PRIOR ART DOCUMENT

Patent Document

Patent Document 1: JP 563-89212A

DISCLOSURE OF THE INVENTION

Object to be Achieved by the Invention

However, in the above-described variable-lead end mill, the plurality of peripheral cutting edges having the respective helix angles that are different from each other, so that a tooth length, a number of teeth and a difference of the helix angle are restricted thereby complicating a tool design such as determinations of the helix angle and casing a case in which the chatter vibration cannot be appropriately prevented. FIG. 38 is a set of development views showing, by way of examples, cases in which the peripheral cutting edges of three-flute, six-flute and four-flute end mills, wherein the peripheral cutting edges are defined by teeth 1-6 and interfere (intersect) with each other, and wherein an upper side of each view corresponds to a shank-portion side, and a lower side of each view corresponds to a bottom-cutting-edge side. Any one of the teeth 1-6 is a right-handed helical tooth, and any one of the three-flute, six-flute and four-flute end mills is to be driven and rotated in clockwise direction as seen from the shank-portion side, for performing a machining operation. In the case of the three-flute end mill shown in a left-side one of the views of FIG. 38, there is a case of interference of the teeth 3 and 1 having the respective helix angles whose difference is large. In the case of the six-flute end mill shown in a middle one of the views of FIG. 38, there are cases of interferences of the teeth 2 and 3, the teeth 4 and 5 and the teeth 6 and 1, each pair of which are adjacent to each other with a narrow interval therebetween. In the case of the long four-flute end mill shown in a right-side one of the views of FIG. 38, there are cases of interferences of the teeth 2 and 3, and the teeth 4 and 1, each pair of which are adjacent to each other even if a difference of the helix angles thereof is relatively small.

The present invention was made in view of the background discussed above. It is therefore an object of the present invention to provide a new end mill effective to suppress chatter vibration even without a variable lead arrangement in which helix angles are different from each other.

Measures for Solving the Problem

For attaining this object, a first invention is, in an end mill comprising a plurality of peripheral cutting edges, characterized in that (a) the plurality of peripheral cutting edges have respective helix angles that are equal to each other, (b) at least one of the plurality of peripheral cutting edges is constituted by a partially-uneven cutting edge that includes an uneven edge portion consisting of a nicked portion or a roughing portion, and (c) the uneven edge portion is provided in only a part of a tooth length of the partially-uneven cutting edge. It is noted each of the peripheral cutting edges does not necessarily have to be defined by a helical tooth and may be defined also by a straight tooth whose helix angle is 0°.

A second invention is, in the end mill of the first invention, characterized in that the partially-uneven cutting edge is defined by a tooth A in which the uneven edge portion has a length ranging from 5% of the tooth length to 65% of the tooth length and is provided in a region extending from a shank-portion side end toward a bottom-cutting-edge side in an axial direction of the end mill by a distance corresponding to 70% of the tooth length, a tooth B in which the uneven edge portion has a length ranging from 5% of the tooth length to 65% of the tooth length and is provided in a region extending from a bottom-cutting edge side end toward a shank-portion side in the axial direction of the end mill by a distance corresponding to 70% of the tooth length, or a tooth C in which the uneven edge portion has a length ranging from 5% of the tooth length to 65% of the tooth length, and is provided in a region extending from a center of the tooth length in directions opposite to each other in the axial direction of the end mill by a distance corresponding to 35% of the tooth length.

A third invention is, in the end mill of the second invention, characterized in that each of the plurality of peripheral cutting edges is defined by one of four types of teeth A-D, such that four types of teeth A-D consist of the teeth A-C each of which defines the partially-uneven cutting edge and a tooth D which does not define the uneven edge portion, and the plurality of peripheral cutting edges are defined by at least two of the four types of teeth A-D, such that each adjacent pair of the peripheral cutting edges adjacent to each other are defined by the teeth that are different in type from each other.

A fourth invention is, in the end mill of any one of the first through third inventions, characterized in that, the helix angles of the plurality of peripheral cutting edges range from 0° to 30°. It is noted that a twist direction of teeth defining the peripheral cutting edges may be either rightward or leftward, as long as the helix angle ranges from 0° to 30° and is set to a value within a range of 60° in total for right and left.

A fifth invention is, in the end mill of any one of the first through fourth inventions, characterized in that a surface of a tooth portion, which is provided with the peripheral cutting edges, is covered with a hard coating.

Effects of the Invention

In the end mill constructed as described above, at least one of the plurality of peripheral cutting edges is constituted by the partially-uneven cutting edge that includes the uneven edge portion consisting of the nicked portion or the roughing portion, and the uneven edge portion is provided in only a part of the tooth length of the partially-uneven cutting edge, so that a magnitude of a cutting force is partially different depending on presence or absence of the uneven edge portion. That is, the cutting force in the uneven edge portion is made smaller whereby resonance is suppressed owing to the difference of the magnitude of the cutting fore. Thus, even in the end mill having the plurality of peripheral cutting edges whose helix angles are equal to each other, it is possible to suppress chatter vibration that could be caused due to the resonance.

In the second invention, the partially-uneven cutting edge is defined by one of three types of teeth A, B and C, wherein the three types of teeth A, B and C are the same in length that ranges from 5% of the tooth length to 65% of the tooth length and are different in position of the uneven edge portion. Thus, the chatter vibration can be appropriately suppressed owing to the difference of the magnitude of the cutting force that is dependent on the presence or absence of the uneven edge portion.

In the third invention, each of the plurality of peripheral cutting edges is defined by one of four types of teeth A-D consisting of the above-described teeth A-C and the tooth D that does not define the uneven edge portion, and the plurality of peripheral cutting edges are defined by at least two of the four types of teeth A-D such that each adjacent pair of the peripheral cutting edges adjacent to each other are defined by the teeth that are different in type from each other. Owing to the arrangement in which each adjacent pair of the peripheral cutting edges are different in the presence or absence of the uneven edge portion and the position of the uneven edge portion, the chatter vibration can be more appropriately suppressed. Further, although burr could occur in a surface portion of a workpiece due to provision of the uneven edge portion, the occurrence of the burr can be suppressed owing to an arrangement in which the plurality of peripheral cutting edges are defined by at least two types of teeth that are different in the presence or absence of the uneven edge portion and the position of the uneven edge portion.

In the fourth invention, the helix angles of the plurality of peripheral cutting edges are relatively small and range from 0° to 30°, so that a feed force is made large whereby the vibration could be easily generated. Therefore, an effect of the present invention, which is to suppress the vibration owing to provision of the partially-uneven cutting edge, can be obtained remarkably. Further, although the small helix angles cause fusion to easily occur whereby a cutting velocity could be restricted, the uneven edge portion divides chip into pieces thereby suppressing occurrence of the fusion, whereby the restriction on the cutting velocity is alleviated thereby enabling a machining operation with high cutting velocity (high rotational speed). Further, although the provision of the partially-uneven cutting edge could easily cause tooth chipping particularly where the helix angles are large, the tooth chipping is suppressed by setting the helix angles to 30° or less. In respect, too, the machining operation with the high cutting velocity (high rotational speed) can be performed.

In the fifth invention, the surface of the tooth portion provided with the plurality of peripheral cutting edges is covered with the hard coating, so that excellent cutting durability can be obtained in spite of the partial presence of the uneven edge portion.

BRIEF DESCRIPTION OF DRAWINGS

FIG. 3 is a set of views showing, by way of examples, a nicked tooth and a roughing tooth, which are provided to define an uneven edge portion Er of FIG. 2, by comparing with a normal tooth.

FIG. 4 is a set of views for explaining specific examples in which the three peripheral cutting edges provided in the end mill of FIG. 1 are defined by three of the four kinds of teeth A-D of FIG. 2.

FIG. 5 is a set of views showing, by way of examples, combinations in which the plurality of peripheral cutting edges are defined by the four kinds of teeth A-D, wherein the examples include the specific examples of FIG. 4.

FIG. 10 is a view for explaining three kinds of test samples Nos. 1-3 used when cutting tests were performed.

FIG. 11 is a view for explaining a resultant force F of resistance values that is measured in the cutting tests.

FIG. 12 is a view for explaining a positional relationship between a work material and a tool in the cutting tests.

FIG. 13 is a view for explaining an amplitude of the resultant force F of resistance values measured in the cutting tests.

FIG. 14 is a view for explaining machining conditions in the cutting tests.

FIG. 15 is a view for explaining values of the amplitude of the resultant force F of resistance values of the test samples Nos. 1-3 measured in machining operations performed in the machining conditions of FIG. 14, and ratios.

FIG. 16 is a view showing the values of the amplitude of the test samples Nos. 1-3 in a condition 1 of FIG. 15, by a graph in a comparative manner.

FIG. 17 is a set of views each showing a vibration waveform of the resultant force F of resistance values measured in the machining operation performed by a corresponding one of the test samples Nos. 1-3 in a condition 1 of FIG. 14, in a comparative manner.

FIG. 18 is a view showing the values of the amplitude of the test samples Nos. 1-3 in a condition 2 of FIG. 15, by a graph in a comparative manner.

FIG. 19 is a set of views each showing the vibration waveform of the resultant force F of resistance values measured in the machining operation performed by a corresponding one of the test samples Nos. 1-3 in a condition 2 of FIG. 14, in a comparative manner.

FIG. 20 is a view for explaining a machining condition when other cutting tests performed, by the test samples Nos. 1-3 shown in FIG. 10, to a different work material.

FIG. 21 is a view for explaining values of the amplitude of the resultant force F of resistance values of the test samples Nos. 1-3 measured in machining operations performed in the machining conditions of FIG. 20, and ratios.

FIG. 22 is a view showing the values of the amplitude of test samples Nos. 1-3 in FIG. 21 by a graph in a comparative manner.

FIG. 23 is a set of views each showing the vibration waveform of the resultant force F of resistance values measured in the machining operation performed by a corresponding one of the test samples Nos. 1-3 in the machining condition of FIG. 20, in a comparative manner.

FIG. 24 is a view for explaining shapes of teeth of six kinds of test samples Nos. 1-6.

FIG. 25 is a view for explaining a machining condition in which cutting tests were performed by the test samples Nos. 1-6 of FIG. 24.

FIG. 26 is a view for explaining results of the cutting tests performed at various values of a cutting velocity in the machining condition of FIG. 25, and indicating whether machining was impossible due to large vibration or not, by "○" and "x" in each of the various values of the cutting velocity.

FIG. 32 is a view for explaining shapes of teeth of eight kinds of test samples Nos. 1-8.

FIG. 33 is a view for more specifically explaining shapes of the teeth of the test samples Nos. 5-8 of FIG. 32.

FIG. 34 is a view for explaining a machining condition in which cutting tests were performed by the test samples Nos. 1-8 of FIG. 32.

FIG. 35 is a view for explaining results of the cutting tests performed at various values of the cutting velocity in the machining condition of FIG. 34, and indicating results related to fusion and chipping in each of the various values of the cutting velocity.

FIG. 36 is a view specifically showing a machining condition when cutting tests were performed by the test samples Nos. 2 and 6 of FIG. 32, and presence of the fusion and chips shown in FIG. 37 were observed.

FIG. 37 is a set of views for explaining results of the tests performed in the machining condition of FIG. 36, and showing, by way of examples, photographs of presence of the fusion on each rake face and the chips.

MODES FOR CARRYING OUT THE INVENTION

Figures 1, 2:
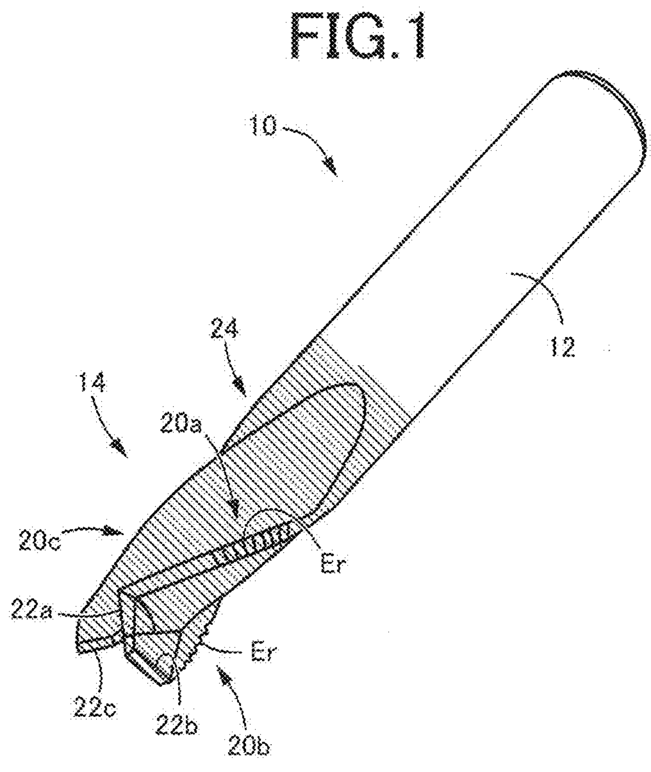
FIG. 1 is a perspective view showing an end mill according to an embodiment of the present invention.
FIG. 2 is a set of views for explaining four kinds of teeth A-D that are used to define three peripheral cutting edges provided in the end mill of FIG. 1.

The end mill of the present invention may be driven and rotated either in clockwise or counterclockwise direction as seen from side of the shank portion, for performing a cutting operation. Although being widely applied to an end mill having three to five teeth, the present invention can be applied also to an end mill having two teeth or six or more teeth. Each of the peripheral cutting edges may be defined by either a straight tooth whose helix angle is 0° or a helical tooth that is twisted rightward or leftward. Although the helix angle is preferably not larger than 30°, each of the peripheral cutting edges may be defined also by the helical tooth whose helix angle is larger than 30°.

At least one of the plurality of peripheral cutting edges is constituted by the partially-uneven cutting edge that includes the uneven edge portion that is provided in only a part of the tooth length. The peripheral cutting edge or edges, which are other than the partially-uneven cutting edge, may not include the uneven edge portion. Further, all of the peripheral cutting edges may be the partially-uneven cutting edge, too. Although it is preferable that the uneven edge portion has a length ranging from 5% of the tooth length of the partially-uneven cutting edge to 65% of the tooth length, for example, the length of the uneven edge portion may be also smaller than 5% of the tooth length or larger than 65% of the tooth length. Further, although the uneven edge portion is provided in a single portion of the partially-uneven cutting edge, the uneven edge portion may be provided in a plurality of portions of the partially-uneven cutting edge. Where a plurality of types of partially-uneven cutting edges, which are different in the position and the length of the uneven edge portion, are provided, it is preferable that the partially-uneven cutting edges adjacent to each other in a circumferential direction are different in type, although they may be also the same in type.

The end mill of the present invention is used advantageously for trimming/cutting operations (outer periphery cutting operations) performed to FRP (fiber reinforced plastics) such as CFRP (carbon fiber reinforced plastics) and CFRTP (carbon fiber reinforced thermoplastics), for example. However, the end mill of the present invention may be used also for cutting operations performed to another work material such as a steel material. As a material forming the end mill, although a cemented carbide or a high-hardness sintered body is preferably used, other hard tool materials such as a high-speed tool steel may be used, too. Moreover, the end mill may be covered with a hard coating, as needed, for increasing a cutting durability. The hard coating may be constituted by, in addition to an intermetallic compound, other coating such as a diamond coating. As the intermetallic compound, a metal of group 4, 5, 6 or 13 of the periodic table, such as carbide, nitride and carbonitride of Al, Ti, V, or Cr, or mutual solid solutions of these. Specifically, TiN, TiAlN, TiCN, TiCrN, AlCrN or the like is preferably used. Such a hard coating of intermetallic compound is preferably formed by PVD method such as arc ion plating method and sputtering method, but can also be formed by other film formation method such as plasma CVD method.

Embodiments

There will be described embodiments of the present invention in details with reference to drawings. It is noted that figures of the drawings are simplified or deformed as needed, and each portion is not necessarily precisely depicted in terms of dimension ratio, shape, angle, etc, for easier understanding of the embodiments.

FIG. 1 is a perspective view showing an end mill 10 according to an embodiment of the present invention. The end mill 10 includes a shank portion 12 and a tooth portion 14 that are coaxial with each other. The tooth portion 14 is provided with three flutes whereby three peripheral cutting edges 20*a*, 20*b*, 20*c* (hereinafter simply referred to as "peripheral cutting edges 20" unless they are to be distinguished from one another). Bottom cutting edges 22*a*, 22*b*, 22*c* (hereinafter simply referred to as "bottom cutting edges 22" unless they are to be distinguished from one another) are provided to be contiguous to distal ends of the respective three peripheral cutting edges 20*a*, 20*b*, 20*c*. The end mill 10 is to be rotated in clockwise direction as seen from side of the shank portion 12, for performing a cutting operation. This end mill 10 is made of a cemented carbide, and a surface of the tooth portion 14 is covered with a hard coating 24 such as a diamond coating. The hard coating 24 is represented by a hatched area in FIG. 1.

At least one of the three peripheral cutting edges 20 is a partially-uneven cutting edge including an uneven edge portion Er that consist of a nicked portion or a roughing portion. In FIG. 1, each of the two peripheral cutting edges 20*a*, 20*b* is the partially-uneven cutting edge including an uneven edge portion Er. FIG. 2 shows teeth A-D, wherein each of the teeth A-C is an example that defines the partially-uneven cutting edge including the uneven edge portion Er that consists of the roughing portion, and wherein the tooth D is a normal tooth defining the cutting edge that does not include the uneven edge portion Er. FIG. 3 is a set of views showing, by way of examples, the nicked portion (nicked tooth) and the roughing portion (roughing tooth) each of which defines the uneven edge portion Er, by comparing with the normal tooth, wherein each of the views is an enlarged photograph that is taken from side of its rake face. The normal tooth is a smooth and standard tooth which defines neither the nicked portion (grooved portion) nor the roughing portion (corrugated portion) and which has a constant outside diameter.

As shown in FIG. 2, in the tooth A, the uneven edge portion Er has a length (0.05L-0.65L) ranging from 5% of a tooth length L to 65% of the tooth length L and is provided in a region extending from a shank-portion side end toward a bottom-cutting-edge side in a tool axial direction by a distance (0.7L) corresponding to 70% of the tooth length L. In the tooth B, the uneven edge portion Er has a length (0.05L-0.65L) ranging from 5% of the tooth length L to 65% of the tooth length L and is provided in a region extending from the bottom-cutting edge side end toward the shank-portion side end in the tool axial direction by a distance (0.7L) corresponding to 70% of the tooth length L. In the tooth C, the uneven edge portion Er has a length (0.05L-0.65L) ranging from 5% of the tooth length L to 65% of the tooth length L, and is provided in a region extending from a center of the tool length L in directions opposite to each other in the tool axial direction by a distance (0.35L) corresponding to 35% of the tooth length L. In the end mill 10 of the present embodiment, each of the three peripheral cutting edges 20 is defined by one of the four types of teeth A-D consisting of the teeth A-C and the tooth D that does not define the uneven edge portion Er, and the three peripheral cutting edges 20 are defined by at least two of the four types of teeth A-D, such that each adjacent pair of the peripheral cutting edges 20 adjacent to each other are defined by the respective teeth that are different in type from each other. In the end mill 10 of the present embodiment which is a three-flute end mill, the three peripheral cutting edges 20 are defined by respective three different types of teeth, which are selected from among the four types of teeth A-D. In FIG. 1, the peripheral cutting edge 20*a* is defined by the tooth A, the peripheral cutting edge 20*b* is defined by the tooth B and the peripheral cutting edge 20*c* is defined by the tooth D. However, various modes are possible as shown in FIG. 4 by way of examples. In FIG. 4, "TOOTH 1", "TOOTH 2" and "TOOTH 3" represent respective teeth defining the three peripheral cutting edges 20*a*-20*c*, and "A", "B", "C" and "D" represent "TOOTH A", "TOOTH B", "TOOTH C" and "TOOTH D" of FIG. 2, respectively. In addition to the examples shown in FIG. 4, a combination of "TOOTH A", "TOOTH C" and "TOOTH D" and a combination of "TOOTH B", "TOOTH C" and "TOOTH D" are also possible.

FIG. 5 is a set of views showing, by way of examples, cases in which the three-flute, four-flute or five-flute end mill is constructed to include at least two of the four types of teeth A-D such that each adjacent pair of the peripheral cutting edges 20 adjacent to each other are defined by the respective teeth that are different in type from each other. It is noted that, when the present invention is carried out, each adjacent pair of the peripheral cutting edges 20 are not necessarily defined by the respective teeth that are different in type from each other, and may be defined by the respective teeth that are the same in kind from each other. Thus, any one of various combinations is possible, as long as the peripheral cutting edges 20 include the partially-uneven cutting edge that is defined by at least one of the three types of teeth A-C.

Figure 6:
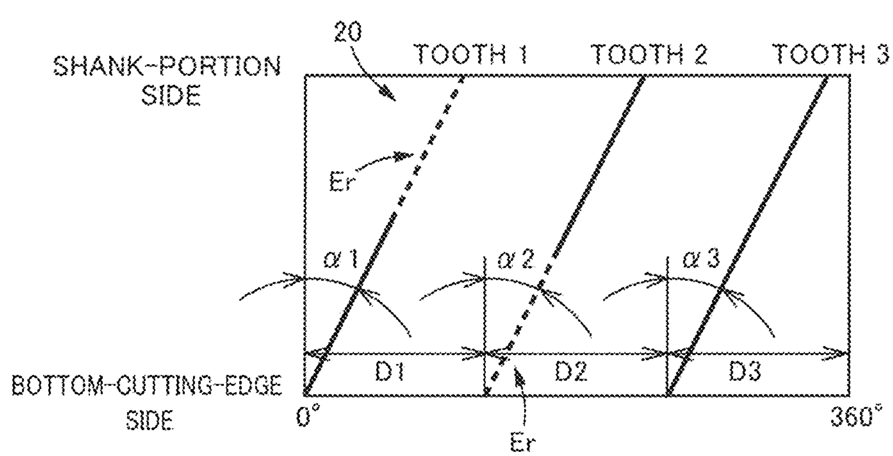
FIG. 6 is a development view showing the three peripheral cutting edges of the end mill of FIG. 1 in a case in which the three peripheral cutting edges around an axis are defined by the teeth A, B and D of FIG. 2.

On the other hand, the three peripheral cutting edges 20*a*, 20*b*, 20*c* have the same helix angle that ranges from 0° to 30°. Each of the peripheral cutting edges 20*a*, 20*b*, 20*c* may be defined by either a right-handed helical tooth or a left-handed helical tooth. The helix angle is set to a value within a range of 60° in total for right and left. In the present embodiment, each of the peripheral cutting edges 20*a*, 20*b*, 20*c* is defined by a straight tooth whose helix angle is 0°, or is defined by a right-handed helical tooth which is twisted rightward and which has the helix angle not larger than 30° so that chips are evacuated toward the shank portion 12. FIG. 6 is a development view showing the three peripheral cutting edges 20*a*, 20*b*, 20*c* of the end mill 10 in a case in which the three peripheral cutting edges 20*a*, 20*b*, 20*c* around an axis are defined by the teeth A, B and D of FIG. 2. In FIG. 6, teeth 1-3 define the peripheral cutting edges 20*a*-20*c*, respectively, and broken line represents the uneven edge portion Er. The teeth 1-3 have respective helix angles $\alpha\mathbf{1}$-$\alpha\mathbf{3}$ (hereinafter simply referred to as "helix angle or angles $\alpha$" unless they are to be distinguished from one another) that are equal to one another ($\alpha\mathbf{1}=\alpha\mathbf{2}=\alpha\mathbf{3}$) so that the peripheral cutting edges 20*a*, 20*b*, 20*c* are equally spaced in a circumferential direction. That is, intervals D1-D3 (hereinafter simply referred to as "interval or intervals D" unless they are to be distinguished from one another) between the teeth 1-3 are equal to one another (D1=D2=D3). FIG. 6 shows a case in which the helix angles $\alpha\mathbf{1}$-$\alpha\mathbf{3}$ are about 25°.

Figure 7:
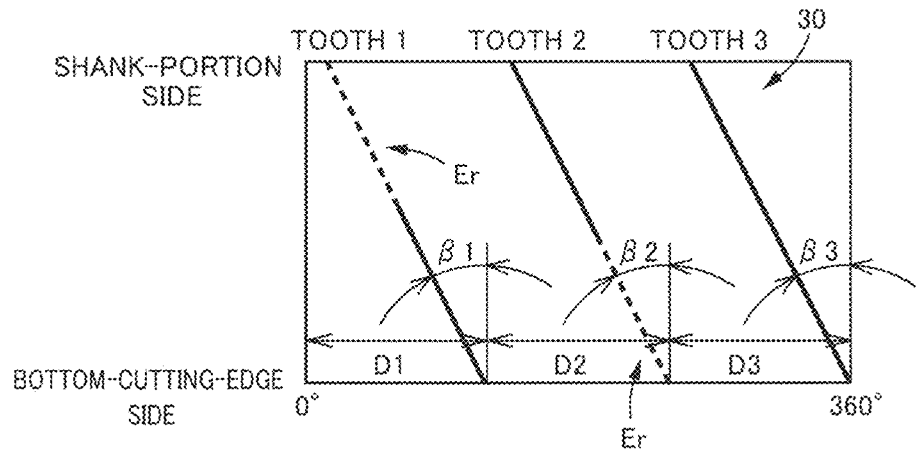
FIG. 7 is a development view corresponding to FIG. 6, for explaining a case in which the three peripheral cutting edges are defined by left-handed helical teeth.
Figure 8:
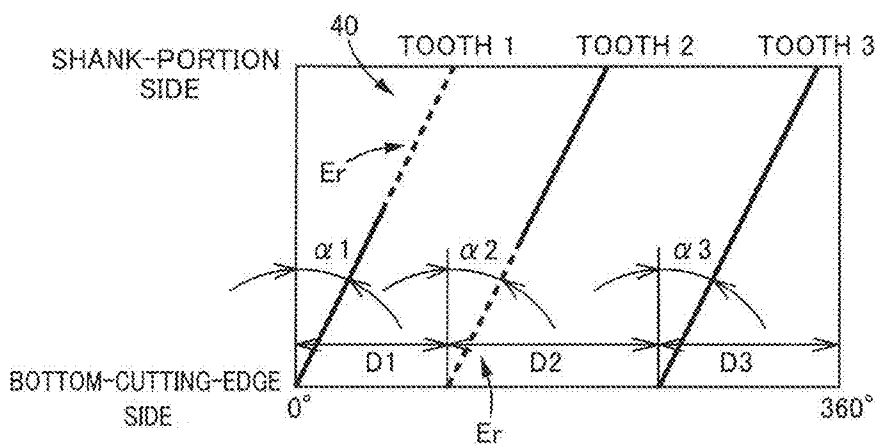
FIG. 8 is a development view corresponding to FIG. 6, for explaining a case in which the three peripheral cutting edges are unequally spaced apart from each other.

FIG. 7 is a development view corresponding to FIG. 6, showing a case in which peripheral cutting edges 30 are defined by left-handed helical teeth having helix angles $\beta\mathbf{1}$-$\beta\mathbf{3}$ which are equal to one another ($\beta\mathbf{1}=\beta\mathbf{2}=\beta\mathbf{3}$) and which range from 0° to 30°, wherein the three teeth 1-3 defining the peripheral cutting edges 30 are equally spaced in the circumferential direction (D1=D2=D3). FIG. 8 is a development view corresponding to FIG. 6, for explaining a case in which peripheral cutting edges 40 are defined by right-handed helical teeth, as the above-described peripheral cutting edges 20, having helix angles $\alpha\mathbf{1}$-$\alpha\mathbf{3}$ which are equal to one another ($\alpha\mathbf{1}=\alpha\mathbf{2}=\alpha\mathbf{3}$) and which range from 0° to 30°, wherein the three teeth 1-3 defining the peripheral cutting edges 40 are unequally spaced in the circumferential direction (D1≠D2≠D3) such that at least one of the intervals D1-D3 is different from another one of the intervals D1-D3. The peripheral cutting edges 30 and 40 are embodiments of the present invention. The peripheral cutting edges 30 of FIG. 7 defined by the left-handed helical teeth may be also unequally spaced in the circumferential direction.

In the end mill 10 as described above, at least one of the plurality of peripheral cutting edges 20, 30, 40 is constituted by the partially-uneven cutting edge that includes the uneven edge portion Er consisting of the nicked portion or the roughing portion, and the uneven edge portion Er is provided in only a part of the tooth length L of the partially-uneven cutting edge, so that the magnitude of the cutting force is partially different depending on presence or absence of the uneven edge portion Er. That is, the cutting force in the uneven edge portion Er is made smaller whereby resonance is suppressed owing to the difference of the magnitude of the cutting force. Thus, even in the end mill 10 having the plurality of peripheral cutting edges 20, 30, 40 whose helix angles α, β are equal to each other, it is possible to suppress chatter vibration that could be caused due to the resonance and to enable a machining operation with high cutting velocity (high rotational speed).

Further, the partially-uneven cutting edge is defined by one of the three types of teeth A, B and C, wherein the three types of teeth A, B and C are the same in length that ranges from 5% of the tooth length L to 65% of the tooth length L and are different in position of the uneven edge portion Er. Thus, the chatter vibration can be appropriately suppressed owing to the difference of the magnitude of the cutting force that is dependent on the presence or absence of the uneven edge portion Er.

Further, as shown in FIGS. 4 and 5, for example, each of the plurality of peripheral cutting edges 20, 30, 40 is defined by one of the four types of teeth A-D consisting of the above-described teeth A-C and the tooth D that does not define the uneven edge portion Er, and the plurality of peripheral cutting edges 20, 30, 40 are defined by at least two of the four types of teeth A-D such that each adjacent pair of the peripheral cutting edges 20, 30, 40 adjacent to each other are defined by the teeth that are different in type from each other. Owing to the arrangement in which each adjacent pair of the peripheral cutting edges 20, 30, 40 are different in the presence or absence of the uneven edge portion Er and the position of the uneven edge portion Er, the chatter vibration can be more appropriately suppressed. Further, although the burr could occur in the surface portion of a workpiece due to provision of the uneven edge portion Er, the occurrence of the burr can be suppressed owing to the arrangement in which the plurality of peripheral cutting edges 20, 30, 40 are defined by at least two types of teeth that are different in the presence or absence of the uneven edge portion Er and the position of the uneven edge portion Er.

Further, the helix angles α, β of the plurality of peripheral cutting edges 20, 30, 40 are relatively small and range from 0° to 30°, so that the feed force is made large whereby the vibration could be easily generated. Therefore, the effect of the present invention, which is to suppress the vibration owing to the arrangement in which at least one of plurality of peripheral cutting edges 20, 30, 40 is constituted by the partially-uneven cutting edge that includes the uneven edge portion Er, can be obtained remarkably. Further, although the small helix angles α, β cause the fusion to easily occur whereby the cutting velocity could be restricted, the uneven edge portion Er divides the chip into pieces thereby suppressing occurrence of the fusion, whereby the restriction on the cutting velocity is alleviated thereby enabling the machining operation with high cutting velocity (high rotational speed). Further, although the provision of the partially-uneven cutting edge, which is defined by one of the teeth A-C, for example, could easily cause tooth chipping particularly where the helix angles α, β are large, the tooth chipping is suppressed by setting the helix angles α, β to 30° or less. In respect, too, the machining operation with the high cutting velocity (high rotational speed) can be performed.

Further, the surface of the tooth portion 40 provided with the plurality of peripheral cutting edges 20, 30, 40 is covered with the hard coating 24 so that excellent cutting durability can be obtained in spite of the partial presence of the uneven edge portion Er.

Figure 9:
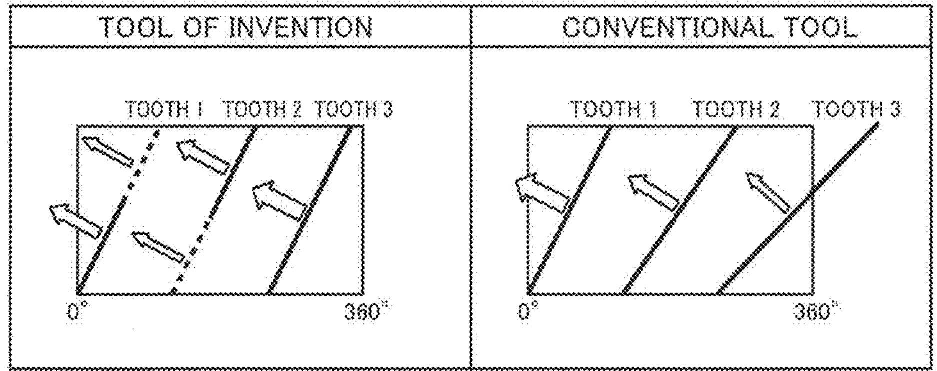
FIG. 9 is a set of views for explaining a direction and a magnitude (width) of a cutting force applied by each of three peripheral cutting edges, by comparing a tool of the present invention and a variable-lead conventional tool.

FIG. 9 is a set of views in which cutting forces applied by three peripheral cutting edges (teeth 1-3) of each of a tool of the present invention and a variable-lead conventional tool are indicated by white arrows in development views, wherein the tool of the present invention corresponds to the above-described end mill 10 provided with the peripheral cutting edges 20 shown in FIG. 6. In FIG. 9, a direction of each of the white arrows represents a direction of a corresponding one of the cutting forces, and a width of each of the white arrows represents a magnitude of a corresponding one of the cutting forces. In the tool of the present invention, the three teeth 1-3 are constituted by the teeth A, B and D of FIG. 2 as in FIG. 6, and the cutting force is reduced in a portion of each of the teeth 1 and 2, which is constituted by the uneven edge portion Er, so that occurrence of resonance is suppressed owing to such a variation of the cutting force whereby an anti-vibration effect can be appropriately obtained as in the variable-lead conventional tool.

Next, there will be described some cutting tests performed for specifically clarifying effects of the present invention.

FIG. 10 is a view for explaining shapes of teeth of test samples Nos. 1-3 used when the cutting tests were performed, wherein the teeth 1-3 define the respective peripheral cutting edges 20*a*-20*c*. The test sample No. 1 is a conventional tool in which any one of the teeth is the tooth D of FIG. 2 that does not define the uneven edge portion Er. Each of the test samples Nos. 2 and 3 is a tool of the present invention which has the partially-uneven cutting edges each including the uneven edge portion Er consisting of the roughing portion. In the test sample No. 2, the three teeth 1-3 are constituted by the above-described teeth A, B and D of FIG. 2. In the test sample No. 3, the three teeth 1-3 are constituted by the above-described teeth A, B and C of FIG. 2. In FIG. 10, "%" in each parenthesis represents a ratio of length of the uneven edge portion Er to the tooth length L in the corresponding tooth. In each of the teeth A, B and C defining the uneven edge portion Er, the above-described ratio is 60%. Each of the three teeth 1-3 of the test samples Nos. 1-3 is the right-handed helical tooth having a helix angle α of 5°, a tooth length L of 12 mm and a tooth diameter 1 of 6 mm. FIG. 11 is a view for explaining a resultant force F of resistance values that is measured in the cutting tests, wherein the resistance values are constituted by a feed force Fx in a direction of feed movement of the tool, a primary force Fy in a direction perpendicular to a machined surface Wf (see FIG. 12) and a thrust force Fz in the tool axial direction (thickness direction of the work material). The resultant force F corresponds to a load applied to the workpiece W. FIG. 12 is a view for explaining a positional relationship between the workpiece W and the tool T in the cutting tests in which trimming/cutting operations are performed to an outer circumferential surface of the workpiece W in a position protruding from a table by 30 mm. FIG. 13 is a view for explaining an amplitude of the resultant force F of resistance values measured in the cutting tests, wherein the amplitude corresponds a difference between a maximum value and a minimum value of the resultant force F.

FIG. 14 shows two machining conditions (conditions 1 and 2) with which trimming/cutting operations were performed to a work material in the form of CFRTP, and the resultant force F was measured and the amplitude was obtained as shown in FIG. 15. The condition 1 and 2 are different in terms of a cutting velocity and a feed rate per tooth such that the cutting velocity in the condition 2 is higher than that in the condition 1, and the feed rate per tooth in the condition 2 is lower than that in the condition 1. FIG. 15 is a view showing the amplitude of the measured resultant force F and a ratio of the amplitude of the measured resultant force F relative to that in the test sample No. 1 that is indicated by 100%. As is apparent from FIG. 15, in the condition 1 in which the cutting velocity is 200 m/min and the feed rate per tooth is 0.08 mm/t, the amplitude was smaller by about 22% in the test sample No. 2 as the tool of the present invention, and the amplitude was smaller by about 41% in the test sample No. 3 as the tool of the present invention. Further, in the condition 2 in which the cutting velocity is higher and the feed rate per tooth is lower than in the condition 1, the amplitude was smaller by about 70% in the test sample No. 2 as the tool of the present invention, and the amplitude was smaller by about 80% in the test sample No. 3 as the tool of the present invention, so that the anti-vibration effect becomes noticeable. FIG. 16 is a view showing the values of the amplitude of the test samples Nos. 1-3 in the condition 1 of FIG. 15, by a graph in a comparative manner. FIG. 17 is a set of views each showing an actual vibration waveform of the resistance value of the resultant force F measured in the machining operation performed by a corresponding one of the test samples Nos. 1-3 in a comparative manner. FIG. 18 is a view showing the values of the amplitude of the test samples Nos. 1-3 in the condition 2 of FIG. 15, by a graph in a comparative manner. FIG. 19 is a set of views each showing the actual vibration waveform of the resistance value of the resultant force F measured in the machining operation performed by a corresponding one of the test samples Nos. 1-3 in a comparative manner. It is noted that each of the used test samples Nos. 1-3 is covered with the diamond coating as the hard coating 24.

FIG. 20 shows a machining condition when other cutting tests performed, by the test samples Nos. 1-3 shown in FIG. 10, to a different work material, wherein side machining operations were performed to S50C (carbon steels for machine structural use) with a cutting depth ap (in axial direction) of 6 mm and a cutting depth ae (in radial direction) of 0.6 mm. FIG. 21 is a view showing values of the amplitude of the measured resultant force F and their ratios relative to the ratio in the test sample No. 1 that is indicated by 100%. The amplitude was smaller by about 12% in the test sample No. 2 as the tool of the present invention, and the amplitude was smaller by about 19% in the test sample No. 3 as the tool of the present invention. FIG. 22 is a view showing the values of the amplitude in FIG. 21 by a graph in a comparative manner. FIG. 23 is a set of views each showing the actual vibration waveform of the resistance value of the measured resultant force F in a comparative manner. It is noted that each of the used test samples Nos. 1-3 is covered with Cr-based intermetallic compound as the hard coating 24.

FIGS. 24-26 are views for explaining results of still other cutting tests. FIG. 24 is a view for explaining six kinds of test samples Nos. 1-6 that are different in shapes of the three teeth 1-3 defining the peripheral cutting edges 20*a*-20*c*. The test sample No. 1 is a conventional tool in which any one of the three teeth 1-3 consists of the tooth D of FIG. 2 without the uneven edge portion Er. In the test samples Nos. 2-6 each of which is a tool of the present invention, each of the three teeth 1-3 constituted by the respective teeth A, B and C of FIG. 2 defines the partially-uneven cutting edge including the uneven edge portion Er consisting of the roughing portion. However, the test samples Nos. 2-6 are different in a ratio of a length of the uneven edge portion Er to the tooth length L, such that the ratio in the test sample No. 2 is 5%, the ratio in the test sample No. 3 is 25%, the ratio in the test sample No. 4 is 45%, the ratio in the test sample No. 5 is 65% and the ratio in the test sample No. 6 is 85%. Each of the three teeth 1-3 of the test samples Nos. 1-6 is the right-handed helical tooth having the helix angle $\alpha$ of 5°, the tooth length L of 12 mm and the tooth diameter $\Phi$ of 6 mm. Further, each of the test samples Nos. 1-6 is covered with the diamond coating as the hard coating 24.

FIG. 26 shows results of machining operations performed at various values of a cutting velocity in the machining condition of FIG. 25, wherein occurrence of chatter vibration was observed. As is clear from FIG. 26, in the test sample No. 1 as the comparative tool, the chatter vibration became so large that the machining operation could not be performed where the cutting velocity was 150 m/min or higher. In each of the test samples Nos. 2-5 as tools of the present invention, the vibration was small in a whole range of the cutting velocity from 50 m/min to 400 m/min, so that the machining operation was stably performed. In the test sample No. 6 in which the ratio of the length of the uneven edge portion Er is 85%, the chatter vibration became so large that the machining operation could not be performed where the cutting velocity was 250 m/min or higher. From the test results, it can be understood that, in each of the test samples Nos. 2-6 as the tools of the present invention provided with the partially-uneven cutting edge (teeth A-C) including the uneven edge portion Er, although the chatter vibration is suppressed, the chatter vibration is likely to occur at a high cutting velocity (high rotational speed), so that it is preferable that the ratio of the length of the uneven edge portion Er to the tooth length L ranges about from 5% to 65%.

Figures 27, 28, 29:
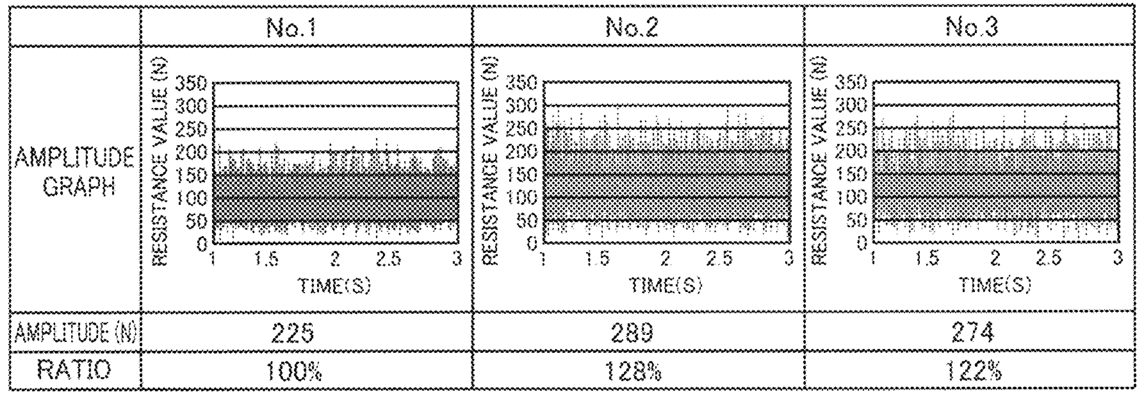
FIG. 27 is a view for explaining shapes of teeth of three kinds of test samples Nos. 1-3.
FIG. 28 is a view for explaining a machining condition in which cutting tests were performed by the test samples Nos. 1-3 of FIG. 27.
FIG. 29 is a set of views each showing the vibration waveform of the resultant force F of resistance values measured in the machining operation performed by a corresponding one of the test samples Nos. 1-3 in the machining condition of FIG. 28, in a comparative manner.

FIGS. 27-29 are views for explaining results of still other cutting tests. FIG. 27 is a view for explaining three kinds of test samples Nos. 1-3 that are different in shapes of the three teeth 1-3 defining the peripheral cutting edges 20*a*-20*c*. Each of the test samples Nos. 1-3 is a tool of the present invention provided with the partially-uneven cutting edge including the roughing portion as the uneven edge portion Er. In the test sample No. 1, the three teeth 1-3 are constituted by the three types of teeth A, B and C of FIG. 2. In the test sample No. 2, the three teeth 1-3 are constituted by the two types of teeth A and B. In the test sample No. 3, the three teeth 1-3 are constituted by the two types of teeth A and C. In FIG. 27, "%" in each parenthesis represents a ratio of length of the uneven edge portion Er to the tooth length L in the corresponding tooth, and the ratio in any tooth is 60%. Each of the three teeth 1-3 of the test samples Nos. 1-3 is the right-handed helical tooth having a helix angle $\alpha$ of 5°, a tooth length L of 12 mm and a tooth diameter $\Phi$ of 6 mm.

FIG. 28 shows a machining condition in which machining operations were performed. FIG. 29 shows an actual vibration waveform of the resistance value of the resultant force F and the amplitude measured in each of the machining operations performed by a corresponding one of the test samples Nos. 1-3, and also their ratios relative to the ratio in the test sample No. 1 that is indicated by 100%. As is clear from FIG. 29, the amplitude in the test sample No. 2 having the two types of teeth A and B was larger by about 28% and the amplitude in the test sample No. 3 having the two types of teeth A and C was larger by about 22%, as compared with the test sample No. 1 having the three types teeth A, B and C. From the test results, it is preferable that the three teeth 1-3 are constituted by the three types of teeth A, B and C such that each adjacent pair of the cutting edges are respective partially-uneven cutting edges that are different in type from each other. It is noted that each of the used test samples Nos. 1-3 is covered with the diamond coating as the hard coating 24.

Figures 30, 31:
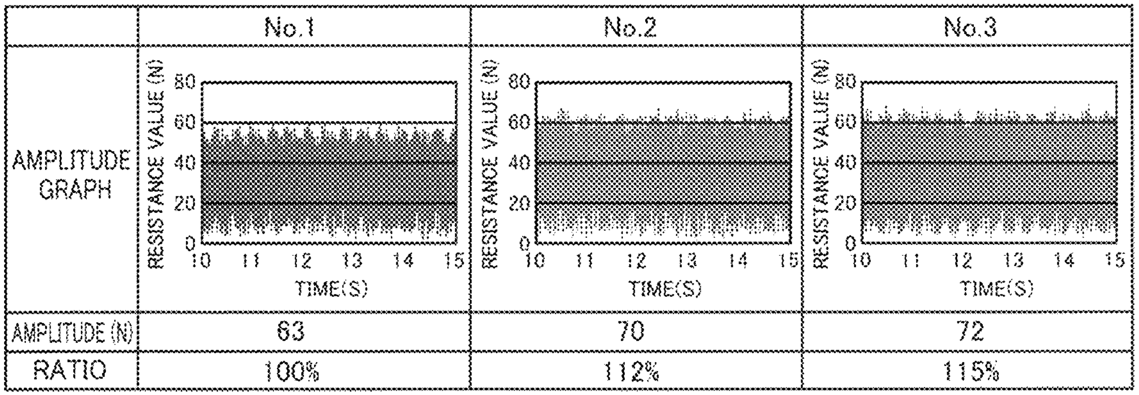
FIG. 30 is a view for explaining a machining condition when other cutting tests performed, by the test samples Nos. 1-3 shown in FIG. 27, to a different work material.
FIG. 31 is a set of views each showing the vibration waveform of the resultant force F of resistance values measured in the machining operation performed by a corresponding one of the test samples Nos. 1-3 in the machining condition of FIG. 30, in a comparative manner.
Figure 38:
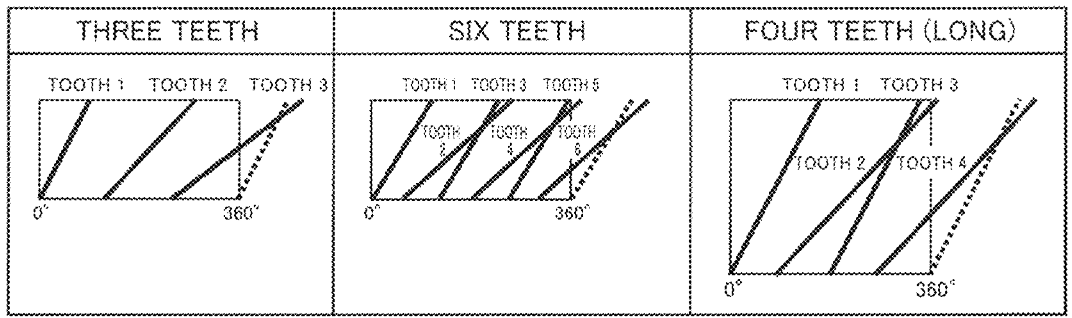
FIG. 38 is a set of views for explaining interference of peripheral cutting edges of variable-lead conventional tools.

FIG. 30 shows a machining condition when other cutting tests performed, by the test samples Nos. 1-3 shown in FIG. 27, to a different work material, wherein side machining operations were performed to S50C (carbon steels for machine structural use) with a cutting depth ap (in axial direction) of 6 mm and a cutting depth ae (in radial direction) of 0.15 mm. FIG. 31 is a view showing values of the amplitude of the measured resultant force F and their ratios relative to the ratio in the test sample No. 1 that is indicated by 100%. The amplitude was larger by about 12% in the test sample No. 2 in which the three teeth 1-3 are constituted by the two types of teeth A and B, and the amplitude was larger by about 15% in the test sample No. 3 in which the three teeth 1-3 are constituted by the two types of teeth A and C, as compared with the amplitude in the test sample No. 1 in which the three teeth 1-3 are constituted by the three types of teeth A, B and C. Thus, also from these test results, it can be understood that it is preferable that the three teeth 1-3 are constituted by the three types of teeth A, B and C such that each adjacent pair of the cutting edges are respective partially-uneven cutting edges that are different in type from each other. It is noted that each of the used test samples Nos. 1-3 is covered with the Cr-based intermetallic compound as the hard coating 24.

FIGS. 32-35 are views for explaining results of still other cutting tests. FIG. 32 is a view for explaining eight kinds of test samples Nos. 1-8 which are three-flute end mills and which are different in shapes of teeth. Each of the test samples Nos. 1-4, which are different only in the helix angle α, is a conventional tool in which each of three teeth 1-3 is the tooth D of FIG. 2 that does not define uneven edge portion Er. That is, the test sample No. 1 has straight teeth whose helix angles α are 0°. The test sample No. 2 has right-handed helical teeth whose helix angles α are 15°. The test sample No. 3 has right-handed helical teeth whose helix angles α are 30°. The test sample No. 4 has right-handed helical teeth whose helix angles α are 40°. Further, each of the test samples Nos. 5-8 is a tool of the present invention that includes the partially-uneven cutting edge including the roughing portion as the uneven edge portion Er. As specifically shown in FIG. 33, the three teeth 1-3 of each of the test samples Nos. 5-8 are constituted by the three types of teeth A, B and C of FIG. 2, such that the teeth A, B and C are the same in the ratio to the tooth length L of the uneven edge portion Er, which is 60%, and are different in the helix angle α. That is, the test sample No. 5 has straight teeth whose helix angles α are 0°. The test sample No. 6 has right-handed helical teeth whose helix angles α are 15°. The test sample No. 7 has right-handed helical teeth whose helix angles α are 30°. The test sample No. 8 has right-handed helical teeth whose helix angles α are 40°. Each of the test sample Nos. 1-8 has the tooth length L of 12 mm, and is covered with the diamond coating as the hard coating 24.

FIG. 35 shows results of machining operations performed at various values of the cutting velocity in the machining condition of FIG. 34, wherein presence and amount of the fusion and presence of the tooth chipping were observed. As is clear from FIG. 35, in the test sample No. 1 in which any one of the three teeth 1-3 has the helix angle α of 0° and consists of the tooth D without the uneven edge portion Er, lots of fusions were observed where the where the cutting velocity was not lower than 150 m/min. Further, in the test sample No. 4 in which the helix angle α is 45°, any issue such as the fusion and the tooth chipping was not observed in a whole range of the cutting velocity from 50 m/min to 400 m/min. In the test samples Nos. 2 and 3, the fusion was observed where the cutting velocity is not lower than 300 m/min. On the other hand, regarding the test samples Nos. 5-8 as tools of the present invention, in the test sample No. 8 in which the helix angles α are 45°, the tooth chipping was observed where the where the cutting velocity is not lower than 300 m/min. However, in the test samples Nos. 5-7 in which the helix angles α range from 0° to 30°, any issue such as the fusion and the tooth chipping was not observed in the whole range of the cutting velocity from 50 m/min to 400 m/min. That is, in the test samples Nos. 5-8 as tools of the present invention each provided with the partially-uneven cutting edges (teeth A-C) each including the uneven edge portion Er, although the chips are divided into pieces by the uneven edge portion Er to prevent the fusion, the tooth chipping could easily occur where the helix angles α are large, so that it is preferable that the helix angles α range about from 0° to 30°.

FIG. 37 shows, by way of examples, photographs of presence of the fusion on each rake face and the chips when machining operations were performed by the test samples Nos. 2 and 6 in which the helix angles α are 15°, at the cutting velocity of 400 m/min. FIG. 36 is a view specifically showing a machining condition when the machining operations were performed. As shown in FIG. 37, in the test sample No. 2 as a conventional tool in which each of three teeth 1-3 is the tooth D of FIG. 2 that does not define uneven edge portion Er, the chip was made large and the fusion was observed on its rake face. In the test sample No. 6 as a tool of the present invention, the chip was divided into small pieces by the roughing portion as the uneven edge portion Er, thereby improving performance of evacuating the chip and preventing the fusion.

While the embodiments of the present invention have been described in detail by reference to the accompanying drawings, it is to be understood that the described embodiments are merely embodied forms and that the present invention can be embodied with various modifications and improvements on the basis of knowledge of those skilled in the art.

DESCRIPTION OF REFERENCE SIGNS

10: end mill
12: shank portion
14: tooth portion
30, 40: peripheral cutting edge
20*b*: peripheral cutting edge (partially-uneven cutting edge)
24: hard coating
A, B, C: tooth (partially-uneven cutting edge)
L: tooth length
Er: uneven edge portion
α1, α2, α3: helix angle (twisted rightward)
β1, β2, β3: helix angle (twisted leftward)

The invention claimed is:

1. An end mill comprising peripheral cutting edges, wherein the peripheral cutting edges have respective helix angles that are equal to each other, at least one of the peripheral cutting edges is constituted by a partially-uneven cutting edge that includes an uneven edge portion including a nicked portion or a roughing portion, the uneven edge portion is provided in only a part of a tooth length of the partially-uneven cutting edge, the partially-uneven cutting edge is defined by a tooth A in which the uneven edge portion has a length ranging from 5% of the tooth length to 65% of the tooth length and is provided in a region extending from a shank-portion side end toward a bottom-cutting-edge side in an axial direction of the end mill by a distance corresponding to 70% of the tooth length, a tooth B in which the uneven edge portion has a length ranging from 5% of the tooth length to 65% of the tooth length and is provided in a region extending from a bottom-cutting edge side end toward a shank-portion side in the axial direction of the end mill by a distance corresponding to 70% of the tooth length, or a tooth C in which the uneven edge portion has a length ranging from 5% of the tooth length to 65% of the tooth length, and is provided in a region extending from a center of the tooth length in directions opposite to each other in the axial direction of the end mill by a distance corresponding to 35% of the tooth length, each of the peripheral cutting edges is defined by one of four types of teeth A-D, such that the four types of teeth A-D include the teeth A-C each of which defines the partially-uneven cutting edge and a tooth D which does not define the uneven edge portion, each of the peripheral cutting edges is of a type, among the four types of teeth A-D, that is different from a type of an adjacent one of the peripheral cutting edges, and the helix angles of the peripheral cutting edges range from 0° to 5°.

2. The end mill according to claim 1, wherein a surface of a tooth portion, which is provided with the peripheral cutting edges, is covered with a hard coating.

3. The end mill according to claim 1, wherein the peripheral cutting edges are defined by at least three of the four types of teeth A-D.

4. The end mill according to claim 3, wherein the at least three of the four types of teeth A-D, which define the peripheral cutting edges, include at least the teeth A-C.

5. The end mill according to claim 1, wherein the peripheral cutting edges include two adjacent cutting edges that are adjacent to each other in a circumferential direction of the end mill, each of the two adjacent cutting edges is constituted by the partially-uneven cutting edge, and at least a part of the uneven edge portion included in one of the two adjacent cutting edges overlaps with at least a part of the uneven edge portion included in another one of the two adjacent cutting edges in a circumferential direction of the end mill.

6. An end mill comprising peripheral cutting edges, wherein the peripheral cutting edges have respective helix angles that are equal to each other, at least one of the peripheral cutting edges is constituted by a partially-uneven cutting edge that includes an uneven edge portion including a nicked portion or a roughing portion, the uneven edge portion is provided in only a part of a tooth length of the partially uneven cutting edge, the partially-uneven cutting edge is defined by a tooth B in which the uneven edge portion has a length ranging from 5% of the tooth length to 65% of the tooth length and is provided in a region extending from a bottom-cutting edge side end toward a shank-portion side in the axial direction of the end mill by a distance corresponding to 70% of the tooth length, or a tooth C in which the uneven edge portion has a length ranging from 5% of the tooth length to 65% of the tooth length, and is provided in a region extending from a center of the tooth length in directions opposite to each other in the axial direction of the end mill by a distance corresponding to 35% of the tooth length, each of the peripheral cutting edges is defined by one of at least three types of teeth B-D, such that the three types of teeth B-D include the teeth B and C each of which defines the partially-uneven cutting edge and a tooth D which does not define the uneven edge portion, each of the peripheral cutting edges is of a type, among the at least three types of teeth B-D, that is different from a type of an adjacent one of the peripheral cutting edges, and the helix angles of the peripheral cutting edges range from 0° to 30°.

7. The end mill according to claim 6, wherein at least one of the peripheral cutting edges is constituted by another partially uneven cutting edge that includes the uneven edge portion including the nicked portion or the roughing portion, the another partially-uneven cutting edge is defined by a tooth A in which the uneven edge portion has a length ranging from 5% of the tooth length to 65% of the tooth length and is provided in a region extending from a shank-portion side end toward a bottom-cutting edge side in an axial direction of the end mill by a distance corresponding to 70% of the tooth length, and each of the peripheral cutting edges is defined by one of four types of teeth A-D, such that the four types of teeth A-D include the teeth B-D and the tooth A that defines the partially-uneven cutting edge.

8. The end mill according to claim 7, wherein the peripheral cutting edges are defined by at least three of the four types of teeth A-D.

9. The end mill according to claim 8, wherein the at least three of the four types of teeth A-D, which define the peripheral cutting edges, include at least the teeth A-C.

10. The end mill according to claim 6, wherein the peripheral cutting edges include two adjacent cutting edges that are adjacent to each other in a circumferential direction of the end mill, each of the two adjacent cutting edges being constituted by the partially-uneven cutting edge, and at least a part of the uneven edge portion included in one of the two adjacent cutting edges overlaps with at least a part of the uneven edge portion included in another one of the two adjacent cutting edges in a circumferential direction of the end mill.

11. The end mill according to claim 6, wherein the helix angles of the peripheral cutting edges range from 0° to 5°.

* * * * *